(12) United States Patent
Detlef

(10) Patent No.: US 7,914,881 B2
(45) Date of Patent: Mar. 29, 2011

(54) PLA FILM WITH GOOD SLIDING AND ANTISTATIC PROPERTIES

(75) Inventor: Hütt Detlef, Heusweiler (DE)

(73) Assignee: Treofan Germany GmbH & Co. KG, Neunkirchen (DE)

( * ) Notice: Subject to any disclaimer, the term of this patent is extended or adjusted under 35 U.S.C. 154(b) by 511 days.

(21) Appl. No.: 10/590,120

(22) PCT Filed: Feb. 22, 2005

(86) PCT No.: PCT/EP2005/001834
§ 371 (c)(1),
(2), (4) Date: Aug. 18, 2006

(87) PCT Pub. No.: WO2005/080078
PCT Pub. Date: Sep. 1, 2005

(65) Prior Publication Data
US 2007/0134505 A1    Jun. 14, 2007

(30) Foreign Application Priority Data
Feb. 25, 2004   (DE) .................. 10 2004 009 003

(51) Int. Cl.
*B32B 7/02* (2006.01)
(52) U.S. Cl. ...... 428/212; 428/220; 428/35.2; 428/35.5; 428/913; 426/415; 524/313

(58) Field of Classification Search .................. 428/212, 428/220, 35.2, 35.5, 913; 426/415; 524/313
See application file for complete search history.

(56) References Cited

U.S. PATENT DOCUMENTS

| 4,818,782 | A * | 4/1989 | Bissot ............................. 524/413 |
| 5,208,297 | A | 5/1993 | Ford et al. |
| 5,247,058 | A | 9/1993 | Gruber et al. |
| 5,357,035 | A | 10/1994 | Gruber et al. |
| 6,117,928 | A | 9/2000 | Hiltunen et al. |
| 6,544,607 | B1 * | 4/2003 | Kuroki et al. ................. 428/35.2 |
| 6,815,079 | B2 | 11/2004 | Rosenbaum et al. |
| 2002/0143136 | A1 | 10/2002 | Noda et al. |
| 2004/0161622 | A1 | 8/2004 | Rosenbaum et al. |

FOREIGN PATENT DOCUMENTS

| EP | 1 029 890 | 8/2000 |
| EP | 1 108 751 | 6/2001 |
| WO | WO-02/087877 | 11/2002 |
| WO | WO-02/088230 | 11/2002 |

* cited by examiner

*Primary Examiner* — Jennifer C McNeil
*Assistant Examiner* — Lawrence D Ferguson
(74) *Attorney, Agent, or Firm* — Connolly Bove Lodge & Hutz LLP

(57) ABSTRACT

The invention relates to a multi-layer biaxially oriented film comprising a base layer and at least one covering layer. Said covering layer comprises at least one polymer of at least one hydroxycarboxylic acid, and contains between 2 and 10 wt. % of a glycerine fatty acid ester and up to 0.5 wt. % of mica.

31 Claims, No Drawings

PLA FILM WITH GOOD SLIDING AND ANTISTATIC PROPERTIES

RELATED APPLICATIONS

This application is a national stage application (under 35 U.S.C. 371) of PCT/EP2005/001834 filed Feb. 22, 2005, which claims benefit of German application 10 2004 009 003.3 filed Feb. 25, 2004.

The present invention relates to a biaxially oriented film which comprises at least one layer which contains at least one polymer of at least one aliphatic hydroxycarboxylic acid, glycerine fatty acid esters and inorganic antiblocking particles. Moreover, the invention relates to a process for the production of the film and its use.

Films of thermoplastic synthetic resins are used on a large scale for packing foods and other goods to be packaged. For these applications, it is essential for the film to have good antistatic and sliding-friction properties.

Recent developments in the field of packaging relate to films of biodegradable polyesters such as e.g. polylactic acid (PLA). Such films are deemed to be particularly environmentally compatible since they are based on renewable resources and can be disposed of by composting. These materials differ, however, substantially from olefinic polymers such as polyethylene and polypropylene which are used on a large scale for packaging films. The transfer of the technical teaching on polyester films, too, is frequently unsuccessful since the same or similar measures often do not have the desired effect in the case of PLA films.

However, for economic success, a comparably satisfactory spectrum of application properties is required to allow these films to be processed using the usual packaging technologies. In this respect, antistatics in combination with the sliding properties of the film play a central part. Numerous investigations have shown that the migrating additives commonly used in the boPP sector which are used to improve these properties, have not proved successful in PLA. As a result of the polar character of the PLA matrix, these migrating additives exhibit completely different migration behaviour. Frequently, these substances reach the surface either not at all or in insufficiently large quantities.

Moreover, it is known in the state of the art to use known inorganic or organic antiblocking particles in the top layers of a film as separator between individual film layers. The antiblocking particles are capable of improving the unwinding behaviour of a film roll by reducing the contact surface between the film layers and additionally advantageously influence the friction properties between a film web and the guide rail of a packaging machine.

In German application with file number 101 21 153.8, a PLA film is described which contains particularly high quantities of glycerine monostearate to improve the antistatics. However, these films still require further improvement.

The addition of large quantities of particles is a satisfactory solution in the case of known polyester films of polyethylene terephthalate, but this modification does not lead to the desired antistatics in the case of PLA films. Moreover, different effective combinations of migrating additives and particulate antiblocking agents are known from the boPP film technology. For this reason, a search has taken place for possible combinations of migrating additives and particulate additives which might bring about a further improvement of the antistatics in the case of PLA films. Within the framework of these investigations, however, it has been found that the use of migrating additives in combination with particulate additives is also critical in the case of PLA.

It has become apparent that some combinations in fact had a more detrimental effect on the antistatics than particles or additives as such. It is suspected that the particulate additives in the PLA matrix influence the migration behaviour of the additives; for example, some types of particle appear to absorb the additives such that they remain almost without effect in the polymer matrix. As an example, it has surprisingly enough been found that the use of silicon dioxide particles in combination with glycerine monostearate as migratable antistatic leads to an increase in the electric surface resistance and to an increased coefficient of friction.

The task of the present invention consisted of making films for environmentally friendly packaging available which is produced from renewable resources, can be disposed of in an environmentally friendly manner and exhibits good antistatic properties. Moreover, good sliding properties and a low coefficient of friction are desirable. For certain applications, a good transparency and high gloss values are additionally required.

The task is achieved by way of a transparent, biaxially oriented film with at least one covering layer whose characteristic features consists of the fact that the covering layer contains at least one polymer of at least one aliphatic hydroxycarboxylic acid and a combination of 1.5 to 10% by weight of glycerine fatty acid ester and >0 to 0.5% by weight of mica, based on the covering layer in each case.

Surprisingly enough, mica and the glycerine fatty acid ester in PLA cooperate in a synergistic manner the causes of which are not being understood completely scientifically. For the joint action, it is essential for the mica and the fatty acid ester to be present in one and the same layer; only then does the addition of mica increase the antistatic effect of the glycerine fatty acid ester. Surprisingly enough, this combined action of antiblocking agent and sliding agent occurs in this selected combination of mica in association with glycerine fatty acid ester. This combination was almost the only combination tested among numerous additive mixtures which have been tested within the framework of the development for the present invention, which caused a detectable improvement in the antistatics. Many combinations were in fact worse than films with the individual component concerned.

Surprisingly enough, mica does not inhibit the antistatic effect of GFS but rather contributes to an improvement in the coefficient of friction and the antistatics. The electric surface resistance is further reduced when adding mica. In this way, films can be made available which exhibit excellent antistatics and/or alternatively, the content of GFS can be reduced in the case of less critical applications in favour of the film optics.

It has been found that the joint incorporation of GFS and mica into the covering layer is essential for the desired effect. In this respect, the invention differs from the recipes commonly used for boPP in the case of which the incorporation of the migrating additives into the base layer is frequently preferred. In comparison, it is preferred for the present invention to add no glycerine fatty acid ester to the base layer although a small quantity, via the addition of reclaimed product, has no negative effect.

According to the invention, the proportion of glycerine fatty acid ester, preferably glycerine monostearic acid ester (GMS) in the covering layer amounts to ≧2% by weight, based on the weight of the covering layer, in order to achieve good antistatic properties. If the content of glycerine fatty acid ester (in the following referred to as GFS), on the other hand, is more than 10% by weight, a negative influence on the optical properties of the film occurs without any further improving effect on the antistatic properties being achieved.

Moreover, the sealing properties may be impaired in the case of high contents of GFS. GFS of more than 10% in the covering layer are consequently not preferred.

For the present invention, glycerine fatty acid esters are suitable in the case of which one, two or all three alcohol functions are esterified with a fatty acid. Monoesters in the case of which only one alcohol group of glycerine is esterified with a fatty acid, the so-called glycerine monofatty acid esters, are preferred. Suitable fatty acids of these compounds have a chain length of 12 to 20 C atoms. Preferably, they are stearic acid, lauric acid or oleic acid. Glycerine monostearate (GMS) has proved to be particularly advantageous.

The preferred concentration of the glycerine fatty acid esters, preferably GMS, is 2.0 to 8% by weight, in particular 3-6% by weight, in the covering layer. All the above values regarding the GMS quantity in % by weight relate to the weight of the covering layer.

Muscovite mica with an average particle size (weighted average) of 0.4-12 μm, in particular 6 to 12 μm is used particularly preferably as antiblocking particle in a concentration of 0.05 to maximum 0.30% by weight (based on the weight of the covering layer) and in particular of 0.10-0.20% by weight. In the case of higher concentrations, particularly above 0.5% by weight, a negative influence on the surface gloss and turbidity occurs which has to be accepted particularly in the case of white or opaque embodiments. Opaque or white embodiments can consequently exhibit up to 2% by weight of mica in the covering layer, 0.5 to 1.5% by weight being preferred. Micas are, as is well known, plate-type silicates whose particle form can also be described by so-called form factors (aspect ratio). For the present invention, micas with a form factor of 5 to 50, preferably 10 to 30 are preferred.

In a further embodiment, calcium silicate (wollastonite) can be used instead of or additionally to mica. Wollastonites are needle-shaped silicates whose average needle length can be up to 150 μm, preferably 50 to 120 μm. The average diameter of these needles is preferably 4 to 10 μm, preferably 6 to 10 μm. Surprisingly enough, these wollastonites do not lead to a considerable increase in turbidity, as is to be expected, in spite of their particle size. Mixtures of these antiblocking particles or identical antiblocking particles with different particle sizes exhibit similar synergistic effects in combination with glycerine fatty acid esters. A further embodiment comprises a mixture of mica and kaolin which can be used in combination with GFS. This combination also proves suitable although kaolins have little effectiveness as "spacers" because of their usually small particle size of less than 1 μm.

The addition of mica, calcium silicates or kaolin takes place in the form of a master batch. However, it is also possible to incorporate these components directly during extrusion during film manufacture. Calcium silicate (wollastonite) or kaolin can be contained in the covering layer in a quantity of 0.05 to 0.3% by weight respectively, this embodiment not exceeding the total quantity of antiblocking agent content of 0.5% by weight, based on the covering layer i.e. the content of mica is correspondingly reduced.

The thickness of the covering layer is generally in the region of 0.5 to 10 μm, preferably 0.5-6 μm, particularly 1 to 3 μm. The thicker the covering layer, the larger the particle diameter of the silicates ought to be chosen. Antiblocking particles generally exhibit a tendency to sink into the thermoplastic covering layer during film manufacture. For this reason, it is guaranteed only in the case of a corresponding particle size in relation of the covering layer that the particles still protrude from the covering layer and are thus able to operate as spacers.

The covering layer which has been rendered antistatic contains 70 to <98% by weight, preferably 80 to <98% by weight, of a polymer of at least one aliphatic hydroxycarboxylic acid, hereinafter referred to as PHC (polyhydroxycarboxylic acids). This should be understood to mean homopolymers or copolymers which are composed of polymerised units of aliphatic hydroxycarboxylic acids. Among the PHC suitable for the present invention, polylactic acids are particularly suitable. These will be referred to in the following as PLA (polylactic acid). In this case, too, the term PLA should be understood to mean both homopolymers composed only of lactic acid units as well as copolymers which contain predominantly lactic acid units (>50%) in association with other aliphatic hydroxylactic acid units.

Aliphatic monohydroycarboxylic, dihydroxycarboxylic or trihydroxycarboxylic acids, in particular, and/or their dimeric cyclic esters, are suitable as monomers of the aliphatic polyhydroxycarboxylic acid (PHC), lactic acid in its D-form or L-form being preferred. A suitable PLA is, for example, polylactic acid from Cargill Dow (NatureWorks®). The production of polylactic acid is known in the state of the art and takes place via catalytic ring opening polymerisation of lactide (1,4-dioxane-3,6-dimethyl2,5-dione), the dimeric cyclic ester of lactic acid; for this reason, PLA is also frequently referred to as polylactide. In the following publications, the manufacture of PLA is described: U.S. Pat. No. 5,208,297, U.S. Pat. No. 5,247,058 or U.S. Pat. No. 5,357,035.

Polylactic acids which are composed exclusively of lactic acid units are suitable. In this respect, PLA homopolymers, in particular, are preferred which contain 80-100% by weight of L-lactic acid units corresponding to 0 to 20% by weight of D-lactic acid units. To reduce the crystallinity, higher concentrations of D-lactic acid units can be contained as comonomer. If necessary, the polylactic acid can additionally exhibit various aliphatic polyhydroxycarboxylic acid units from lactic acid as comonomers, for example glycolic acid units, 3-hydroxypropanoic acid units, 2,2-dimethyl-3-hydroxypropanoic acid units or higher homologues of the hydroxycarboxylic acids with up to 5 carbon atoms.

Lactic acid polymers (PLA) with a melting point of 110 to 170°, preferably 125 to 165° C. and a melt index (determination according to DIN 53 735 under a load of 2.16 N and at 190° C.) of 1 to 50 g/10 min, preferably 1 to −30 g/10 min are preferred. The molecular weight of the PLA is within a range of at least 10,000 to 500,000 (number average), preferably 50,000 to 300,000 (number average). The glass transition temperature Tg is in the region of 40 to 100° C., preferably 40 to 80° C.

For sealable embodiments, an amorphous PLA is preferred for the covering layer. Such sealable PLA polymers exhibit a Tg in the region of 50 to 80° C. The sealing onset temperature of this film is in the region of 70-90° C. The covering layer thickness of these sealing layers is in the region of 0.5 to 3 μm, preferably 1 to 2 μm.

The film according to the invention has a multilayer construction and comprises at least the base layer and at least one covering layer of PHC rendered antistatic, glycerine fatty acid esters and mica. If necessary, a further covering layer can be applied on the opposite side of the film, it being possible for this covering layer to be also rendered antistatic with GFS and mica or not rendered antistatic. Moreover, it is possible to apply between the base layer and the covering layer or covering layers additionally one intermediate layer or on both sides as a result of which four or five layered films are obtained.

According to the meaning of the present invention, the base layer is that layer which exhibits the greatest layer thickness and, in general, constitutes more than 40% to 98%, preferably 50 to 90%, of the overall film thickness. The covering layers are the layers which form the outer layer of the film. Intermediate layers are naturally placed between the base layer and the covering layers.

According to the meaning of the present invention, transparent films are understood to be those films whose light permeability according to ASTM-D 1003-77 is more than 95%, preferably more than 75%. It has been found that the incorporation of the high concentrations of GFS into the covering layer does not increase the turbidity of the film. In this respect, too, the selection of GFS as antistatic treatment in the covering layer has proved to be surprisingly advantageous.

The base layer of the film generally contains at least 90 to <100% by weight, preferably 95 to 99% by weight, based on the weight of the layer, of polymers of at least one hydroxycarboxylic acid, hereinafter referred to as HPC (polyhydroxycarboxylic acid). This should be understood to mean homopolymers or copolymers which are composed of polymerised units, preferably aliphatic hydroxycarboxylic acids. Among the PHCs suitable for the base layer, polylactic acids are particularly suitable, including both homopolymers which are composed only of lactic acid units and mixed copolymers which contain predominantly lactic acid units (>50%) in combination with other aliphatic hydroxylactic acid units.

Aliphatic monohydroxycarboxylic, dihydroxycarboxylic or trihydroxycarboxylic acids and/or their dimeric cyclic esters are particularly suitable as monomers of the aliphatic polyhydroxycarboxylic acid (PHC), lactic acid in its D-form of L-form being preferred. A suitable PLA is, for example, polylactic acid from Cargill Dow (NatureWorks®). The manufacture of polylactic acid is well known in the state of the art and takes place via catalytic ring opening polymerisation of lactide (1,4-dioxane-3,6-dimethyl2,5-dione) the dimeric cyclic ester of lactic acid; consequently, PLA is frequently also referred to as polylactide. In the following publications, the manufacture of PLA is described: U.S. Pat. No. 5,208,297, U.S. Pat. No. 5,247,058 of U.S. Pat. No. 5,357,035.

Polylactic acids which are composed exclusively of lactic acid units are preferred. In this respect, PLA homopolymers, in particular, are preferred which contain 80-100% by weight L-lactic acid units corresponding to 0 to 20% by weight of D-lactic acid units. To reduce the crystallinity, higher concentrations of D-lactic acid units can be contained as comonomer. If necessary, the polylactic acid can additionally exhibit different aliphatic polyhydroxycarboxylic acid units from the lactic acid as comonomers, e.g. glycolic acid units, 3-hydroxy propanoic acid units, 2,2-dimethyl-3-hydroxy propanoic acid units or higher homologues of hydroxycarboxylic acids with up to 5 carbon atoms.

Lactic acid polymers (PLA) with a melting point of 110 to 170°, preferably 125 to 165° C. and a melt index (determination according to DIN 53 735 under a load of 2.16 N and at 190° C.) of 1 to 50 g/10 min, preferably 1 to –30 g/10 min are preferred. The molecular weight of the PLA is within a range of at least 10,000 to 500,000 (number average), preferably 50,000 to 300,000 (number average). The glass transition temperature Tg is in the region of 40 to 100° C., preferably 40 to 80° C.

The base layer and the other layers of the film, including the covering layer rendered antistatic can additionally contain the usual additives such as neutralising agents, stabilisers, slip agents and fillers. Appropriately, they are added to the polymer or the polymer mixture before melting. Phosphorus compounds such as phosphoric acid or phosphoric acid esters are used as stabilisers, for example.

For white or opaque embodiments of the film, pigments and/or vacuole initiating fillers can be added to the base layer. $TiO_2$ is preferred as pigment and used in a quantity of 1-15% by weight, preferably up to 10% by weight, in particular 1 to 8% by weight, based on the base layer.

Vacuole initiating fillers are generally contained in a quantity of 3 to 15% by weight, preferably 5 to 10% by weight. For these purposes, cycloolefin polymers such as those described in EP 1385 899 are preferred to which specific reference is made herewith.

The total thickness of the film can be varied within wide limits and depends on the intended application. The preferred embodiments of the film according to the invention have a total thickness of 4 to 200 µm, 8 to 150 µm, in particular 10 to 100 µm being preferred. The thickness of the intermediate layer(s), is preferably usually independently of each other 0.5 to 15 µm, intermediate layer thicknesses of 1 to 10 µm, in particular 1 to 8 µm being preferred. The values indicated relate to an intermediate layer in each case. The thickness of the second covering layer(s) is selected independently of the other layers and is preferably in the region of 0.1 to 5 µm, in particular 0.2 to 3 µm, it being possible for the second covering layer to be different from the first covering layer as regards the thickness and composition. The thickness of the base layer is consequently obtained correspondingly from the difference of the total thickness of the film and the thickness of the covering and intermediate layer(s) applied and can consequently be varied within wide limits in a manner analogous to the total thickness.

The invention moreover relates to a process for the production of the multiple layer film according to the invention according to the extrusion process known as such.

Within the framework of this process, one proceeds in such a way that the melt(s) corresponding to the layers of the film is/are coextruded through a flat die, the multiple film thus obtained is pulled off from one or several rollers for solidification, the film is subsequently biaxially stretched (oriented), the biaxially stretched film is heat set and, if necessary, corona or flame treated on the surface layer intended for treatment.

Biaxial stretching is generally carried out sequentially. For this purpose, stretching is carried out first longitudinally (i.e. in machine direction, =MD direction) and subsequently in transverse direction (i.e. vertical to the machine direction, =TD direction). This leads to an orientation of the molecule chains. Stretching in the longitudinal direction preferably takes place by means of two rollers operating at different speeds to correspond to the intended stretching ratio. For transverse stretching, a corresponding screw stock frame is generally used. The further description of the film manufacture is effected by way of the example of a lat film extrusion with subsequent sequential stretching.

The melt(s) is/are pressed through a flat die (slit die) and the pressed film is pulled off from one or several take-off rollers at a temperature of 10 to 100° C., preferably 20 to 80° C. while it is being cooled and solidifies.

The film thus obtained is then stretched longitudinally and transverse to the direction of extrusion. Longitudinal stretching is preferably carried out at a roller temperature of the stretching rollers of 40 to 130° C., preferably 50 to 100° C., appropriately by means of two corresponding rollers operating at different speeds to correspond to the stretching ratio intended and transverse stretching is carried out preferably at a temperature of 50 to 130° C., preferably 60 to 120° C. by means of a corresponding screw stock frame. The longitudinal stretching ratios can be varied within the region of 1.5 to 8. During the manufacture of films with a base layer containing vacuole initiating fillers, a higher longitudinal stretching ratio of 3 to 6 is preferred, whereas films with a transparent base layer are preferably stretched within the region of 1.5 to 3.5. The transverse stretching ratios are in the region of 3 to 10, preferably 4 to 7.

Stretching of the film is followed by heat setting (thermal treatment), the film being kept in a converging manner for approximately 0.1 to 10 s at a temperature of 60 to 150° C. (convergence up to 25%). Subsequently, the film is wound with a winding device in the usual manner.

It has proved to be particularly advantageous to incorporate the glycerine fatty acid ester and/or the mica via a concentrate into the covering layer of the film. It has been found that the distribution of the additives in the covering layer is more homogenous and the antistatic properties overall are better than in the case of direct incorporation. The concentrates can be based on comparable lactic acid polymers as the covering layer or the base layer. If necessary, the use of mixtures of polyolefins such as polypropylene or polyethylene and GFS and/or particles is also possible, which GFS and/or particles are contained in a quantity of 20 to 60% by weight, based on the master batch. Surprisingly enough, concentrates based on polyolefins exhibit the same effect, i.e. polyolefins mixed in via the concentrate do not impair the synergistic effect of the mica GFS combination.

If necessary, the film can be coated to adjust further properties. Typical coatings are coupling, slip improving or dehesive acting layers. If necessary, these additional layers can be applied via in-line coating my means of aqueous dispersions before transfer stretching or off-line.

The film according to the invention is characterised by excellent antistatic properties. As a result, good handling of the film is possible during manufacture, winding and processing. In addition, transparent embodiments of the film according to the invention have a very good transparency which is not impaired by the addition of large quantities of GFS in combination with mica in the covering layer. In addition, it has been found that no problems as a result of deposits or vapour deposition have arisen during the manufacture of the film. Such problems are known when using GMS in polypropylene films, for example. They do not occur in the production process according to the invention. In addition, it has become apparent that the films exhibit the good antistatic properties as early as immediately after production and remain stable over time. This, too, is a clear advantage compared with films whose antistatics arise only on completion of migration processes. It has been found that by adding GMS in combination with mica, the specific surface resistance of the film is reduced compared with the corresponding specific surface resistance of PLA. According to the invention, the specific surface resistance is less than $10^{13}$ $\Omega/m^2$. Moreover, the film exhibits a good, i.e. low, sliding friction as a result of which the sliding and processing properties are additionally advantageously influenced.

To characterise the raw materials and the films, the following measured values were used:
Antistatics:
Measuring the surface resistance takes place according to DIN 53482 using a spring tongue electrode and the electric chargeability according to DIN 57303.
Friction
Measuring the coefficient of friction takes places according to ISO 8295.
Gloss
The gloss was measured according to DIN 67530 at an angle of 20°.

The invention will now be explained in further detail by way of practical examples.

EXAMPLE 1

A transparent three-layered PLA film with a thickness of approximately 30 μm was produced by extrusion and subsequent stepwise orientation in longitudinal and transverse direction. The base layer consisted to a level of almost 100% by weight of a polylactic acid with a melting point of approximately 160° C. The layer additionally contained stabilisers and neutralising agents in the usual quantities. The covering layer whose thickness amounted to approximately 2.5 μm contained, apart from PLA, 2% by weight of GMS and 0.15% by weight of muscovite mica as additives. The production conditions in the individual process steps were:
Extrusion: Temperatures 170-200° C.
  Temperature of the take-off roller 60° C.
Longitudinal stretching: Temperature 68° C.
  Longitudinal stretching ratio 2.0
Transverse stretching: Temperature 88° C.
  Transverse stretching ratio (effective) 5.5
Fixing: Temperature 75° C.
  Convergence 5%
In this way, a transparent film with a characteristic gloss of approximately 130 at an angle of 20° C. and a reduced specific surface resistance of approximately $2*10^{12}$ $\Omega/m^2$ and a COF of 0.20 was obtained.

EXAMPLE 2

A three-layered film as described in example 1 was produced. The content of GMS was retained. In contrast to example 1, calcium silicate (wollastonite) was used as antiblocking particle. The quantity of calcium silicate again amounted to 0.15% by weight. Again, a transparent film with a gloss of 125 (20°), a reduced specific surface resistance of approximately $6*10^{12}$ $\Omega/m^2$ and an improved coefficient of sliding friction (COF=0.25) was obtained.

EXAMPLE 3

A three-layered film as described in example 1 but with a lower content of GMS of 1.5% by weight was produced. Muscovite mica was used as antiblocking particles in a concentration of 0.15% by weight. A transparent film with a gloss of 130 (20° C.) and a low turbidity was obtained. The film had a reduced specific surface resistance of approximately $8*10^{12}$ $\Omega/m^2$ and a sufficiently satisfactory coefficient of sliding friction of 0.35.

COMPARATIVE EXAMPLE 1

A film as described in example 1 was produced. The content of GMS was 2.0% by weight, as in example 1. In contrast to example 1, silicon dioxide (Grace Sylobloc 45) was used as antiblocking particle in a concentration of 0.15% by weight. This film exhibited neither good antistatic properties (specific surface resistance $5*10^{12}$ $\Omega/m^2$) nor an improved coefficient of sliding friction (COF=0.50).

COMPARATIVE EXAMPLE 2

A film as described in example 1 was produced. In contrast to example 1, no mica was added to the film. It consequently contained only 2% by weight of GMS in the covering layer. Although the film had good antistatic properties (specific surface resistance 9*10$^{13}$ Ω/m$^2$), it had only a moderately improved coefficient of sliding friction (COF=0.40).

COMPARATIVE EXAMPLE 3

A film as described in example 1 was produced. In contrast to example 1, no GMS was added to the film. It consequently contained only 0.15% by weight of mica in the covering layer. Although comparative example 3 exhibited slightly improved antistatic properties (specific surface resistance 2*10$^{13}$ Ω/m$^2$) it had a coefficient of sliding friction still satisfactory for many applications (COF=0.35).

COMPARATIVE EXAMPLE 4

A film as described in example 1 was produced. In contrast to example 1, the film now contained 2% by weight of GMS in the base layer. The covering layer continued to contain 0.15% by weight of mica; however no GMS was added. In comparison with the previous comparative example 3, the film exhibited neither improved antistatic properties (specific surface resistance 1*10$^{13}$ Ω/m$^2$) nor an improved coefficient of sliding friction (COF=0.35).

| Example | Anti-blocking agent | Quantity in weight % | Quantity of GMS in % by weight | Dynamic coefficient of friction according to ISO 8298 | Surface resistance in *10$^{12}$ Ohm/m$^2$ | Gloss (20°) |
|---|---|---|---|---|---|---|
| Example 1 | Mica | 0.15 | 2.0 | 0.20 | 2 | 130 |
| Example 2 | Ca silicate | 0.15 | 2.0 | 0.25 | 6 | 125 |
| Example 3 | Mica | 0.15 | 1.5 | 0.35 | 8 | 130 |
| Comparative example 1 | SiO$_2$ | 0.15 | 2.0 | 0.50 | 5 | 130 |
| Comparative example 2 | — | 0 | 2.0 | 0.40 | 9 | 130 |
| Comparative example 3 | Mica | 0.15 | 0 | 0.35 | 20 | 130 |
| Comparative example 4 | Mica | 0.15 | 2.0* | 0.35 | 10 | 135 |

*25 GMS were present in the base layer

The invention claimed is:

1. A multiple layer biaxially oriented coextruded film comprising a base layer and at least one covering layer, wherein said base layer comprises at least one polymer of at least one aliphatic hydroxycarboxylic acid and wherein said at least one covering layer comprises at least one polymer of at least one aliphatic hydroxycarboxylic acid, from 1.5 to 10% by weight of a glycerine monofatty acid ester, and up to 0.5% by weight of mica, based on the weight of the covering layer respectively, and wherein said covering layer has a thickness of up to 6 μm.

2. The film according to claim 1, wherein said content of glycerine-monofatty acid ester is from 2 to 8% by weight, based on the weight of the covering layer.

3. The film according to claim 1, wherein said glycerine monofatty acid ester is glycerine monostearate.

4. The film according to claim 1, wherein said mica has a particle size of from 4 to 12 μm.

5. The film according to claim 1, wherein said mica has a form factor (aspect ratio) of from 5 to 50.

6. The film according to claim 1, wherein said covering layer comprises from 0.05 to 0.30% by weight of mica.

7. The film according to claim 1, wherein said covering layer additionally comprises calcium silicate (wollastonite) or kaolin.

8. The film according to claim 7, further comprising calcium silicate (wollastonite) or kaolin in a quantity of from 0.5 to 0.3% by weight respectively, the total quantity of antiblocking agent content not exceeding 0.5% by weight, based on the covering layer.

9. The film according to claim 1, wherein said covering layer comprises from 70 to less than 98% by weight of a polymer of aliphatic hydroxycarboxylic acid.

10. The film according to claim 9, wherein said aliphatic hydroxycarboxylic acid is a PLA.

11. The film according to claim 1, wherein said base layer is transparent and comprises between 90 and 100% by weight of a polyhydroxycarboxylic acid.

12. The film according to claim 11, wherein said polyhydroxycarboxylic acid is PLA.

13. The film according to claim 1, wherein said base layer is opaque and further comprises vacuole initiating filler.

14. The film according to claim 1, wherein said covering layer is sealable.

15. The film according to claim 1, wherein said film has a gloss of from 120 to 150 at an angle of 20°.

16. The film according to claim 1, wherein said film has a surface resistance of less than or equal to 6*10$^{12}$ Ohm/m$^2$.

17. The film according to claim 16, wherein said surface resistance is from 1*10$^{12}$ to 4*10$^{12}$ Ohm/m$^2$.

18. The film according to claim 1, wherein said film has a dynamic coefficient of friction of less than 0.30.

19. The film according to claim 18, wherein said dynamic coefficient is from 0.05 to 0.25.

20. A process for the production of a film according to claim 1 comprising incorporating the glycerine monofatty acid ester and antiblocking particles into said covering layer via a concentrate.

21. The process according to claim 20, wherein said concentrate comprises a polyolefin.

22. The process according to claim 21, wherein said polyolefin is polyethylene or polypropylene.

23. A packaged foodstuff or product, wherein said packaging comprises the film according to claim 1.

24. A multiple layer biaxially oriented coextruded opaque of white film comprising a base layer and at least one covering layer, wherein said base layer comprises at least one polymer of at least one aliphatic hydroxycarboxylic acid and wherein said covering layer comprises at least one polymer of at least one aliphatic hydroxycarboxylic acid, from 1.5 to 10% by weight of a glycerine monofatty acid ester, and up to 2% by weight of mica, based on the weight of the covering layer respectively, and wherein said covering layer has a thickness of up to 6 μm.

25. The film according to claim 24, wherein said base layer comprises TiO2.

26. The film according to claim 25, wherein said base layer comprises from 1 to 15% by weight of TiO2.

27. The film according to claim 24, wherein said base layer comprises vacuole initiating filler.

28. The film according to claim 27, wherein said vacuole initiating filler comprises COC.

29. The film according to claim 24, wherein said base layer comprises vacuole initiating filler in a quantity of from 3 to 15% by weight.

30. The film according to claim 24, wherein said base layer comprises vacuole initiating filler and TiO2.

31. A multiple layer biaxially oriented coextruded film comprising a base layer and at least one covering layer, wherein said base layer comprises at least one polymer of at least one aliphatic hydroxycarboxylic acid and wherein said covering layer comprises at least one polymer of at least one aliphatic hydroxycarboxylic acid, from 1.5 to 10% by weight of a glycerine monofatty acid ester, and up to 0.3% by weight of wollastonite, based on the covering layer respectively, and wherein said covering layer has a thickness of up to 6 μm.

* * * * *